A. BOWDISH.
CULTIVATOR.
APPLICATION FILED FEB. 12, 1914.
1,131,110.
Patented Mar. 9, 1915.
2 SHEETS—SHEET 1.
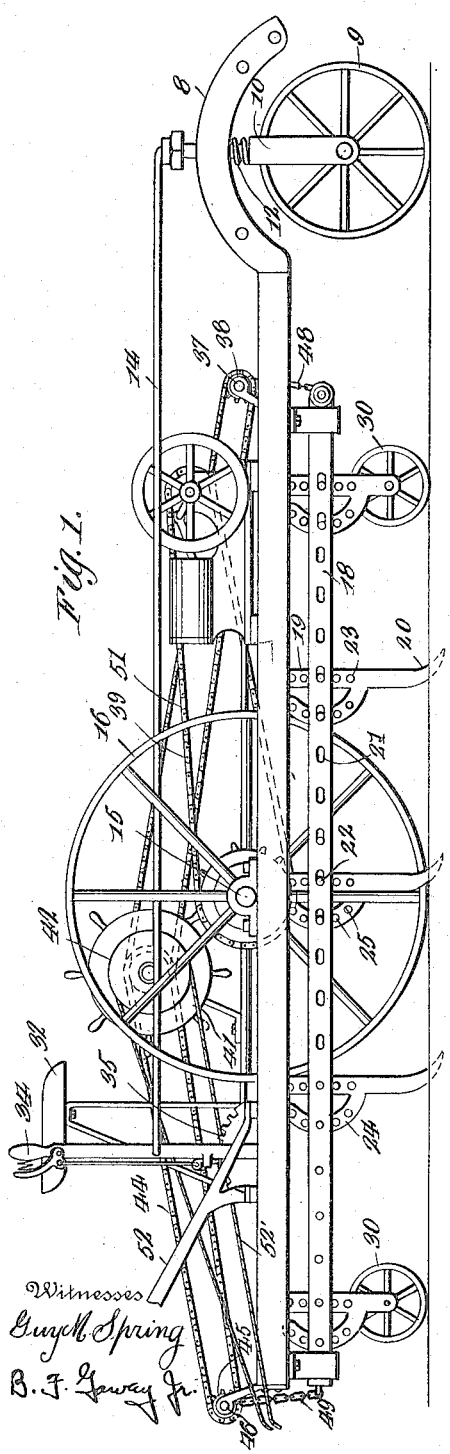
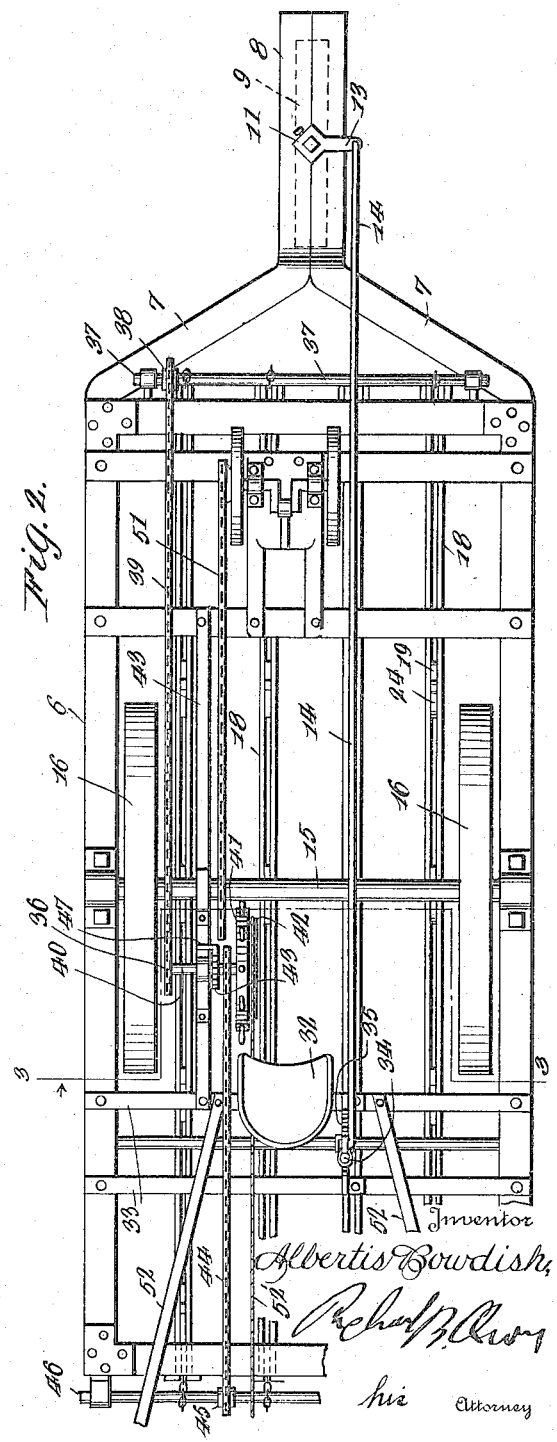

A. BOWDISH.
CULTIVATOR.
APPLICATION FILED FEB. 12, 1914.
1,131,110.
Patented Mar. 9, 1915.
2 SHEETS—SHEET 2.
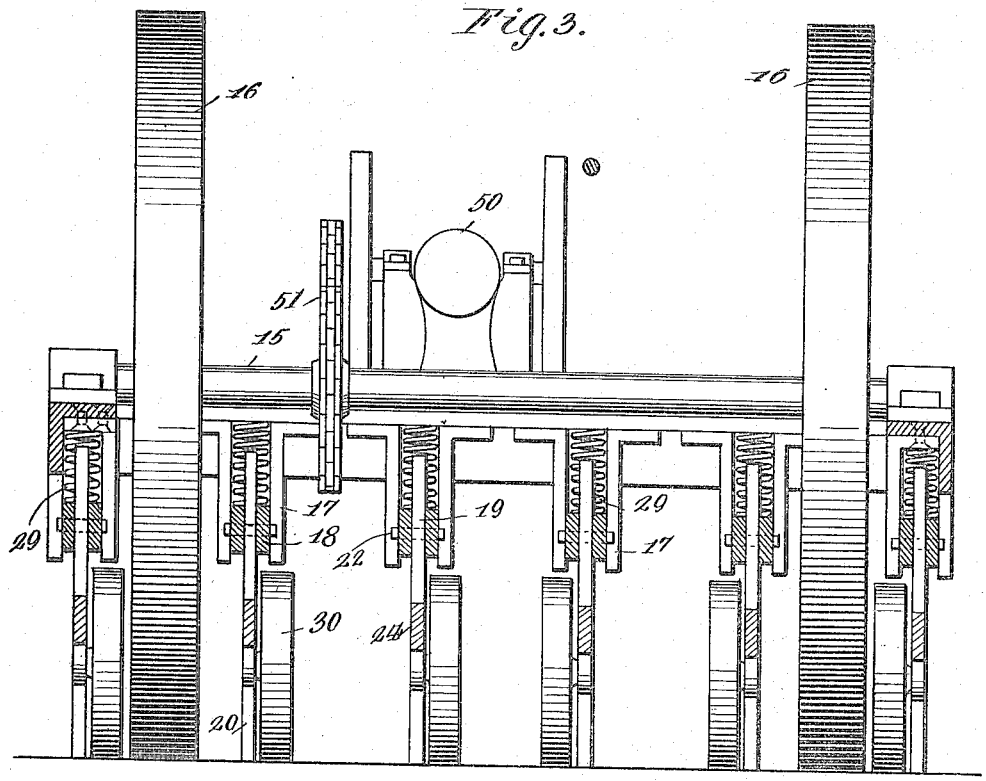
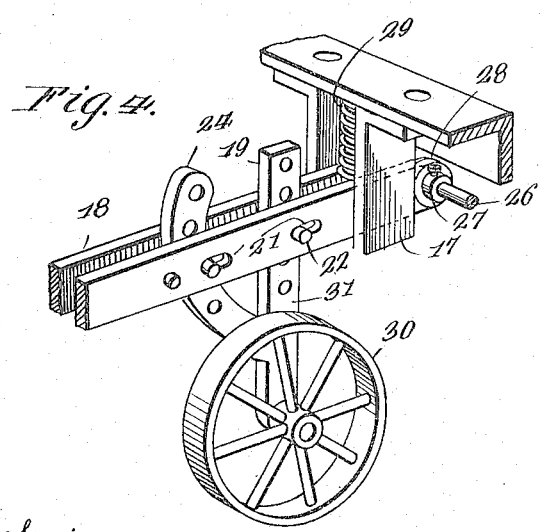
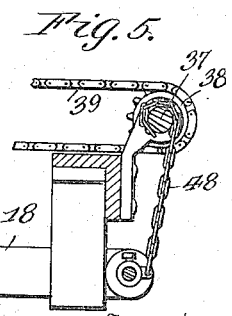
Witnesses
Guy M. Spring
B. F. Garvey Jr.
Inventor
Albertis Bowdish,
By
his Attorney

UNITED STATES PATENT OFFICE.

ALBERTIS BOWDISH, OF NORWICH, NEW YORK, ASSIGNOR OF THREE-FOURTHS TO JOHN W. RHINES, FOSTER K. RHINES, AND ROBERT T. SHAW, ALL OF CORTLAND, NEW YORK.

CULTIVATOR.

1,131,110. Specification of Letters Patent. Patented Mar. 9, 1915.

Application filed February 12, 1914. Serial No. 818,338.

*To all whom it may concern:*

Be it known that I, ALBERTIS BOWDISH, a citizen of the United States, residing at 33 Pleasant street, Norwich, in the county of Chenango and State of New York, have invented certain new and useful Improvements in Cultivators, of which the following is a specification.

This invention relates to cultivators having for its primary object to resiliently mount the cultivator teeth so as to yield under pressure and having suitable means associated therewith in order to regulate the depth of penetration of the teeth in the earth, thereby providing for a uniform penetration of the teeth at all times.

Other objects of the invention are to provide an elevating mechanism by which the teeth are simultaneously raised from the earth either through the instrumentality of an operating wheel adjacent the operator's seat or at the rear of the device by a cable arrangement which is in connection with the operating wheel; to connect the teeth to the supporting member through the medium of break pins thereby preventing the incapacitating of the teeth should they contact with rigid objects beneath the surface of the earth such as rocks, tree roots or the like; to utilize a power element for actuating the device although motion may be imparted thereto by draft animals in the usual manner if so desired; and to permit the device to be guided either from the operator's seat on the main frame or from the rear of the frame in the usual manner by guide handles.

Other objects as well as the nature, characteristic features and scope of my invention will be more readily understood from the following description taken in connection with the accompanying drawings and pointed out in the claims forming a part of this specification.

Referring to the drawings: Figure 1 is a side elevation of a cultivator constructed in accordance with my invention; Fig. 2 is a top plan view of the same; Fig. 3 is a transverse sectional view taken on the line 3—3 of Fig. 2 and looking in the direction of the arrows showing to advantage the manner in which the cultivator teeth are resiliently mounted; Fig. 4 is a perspective view of one of the guide wheels showing the manner in which it is connected to its respective supporting beam likewise the manner in which the supporting beams are resiliently associated with the main frame; and Fig. 5 is a detail enlarged perspective view illustrating the manner of connection between the elevating mechanism and the cultivator teeth supporting beams.

In the drawings wherein is illustrated the preferred embodiment of this invention a main frame 6 is provided which in the present instance is of an oblong configuration having extending from the forward end thereof a pair of bars 7 the free end of which converge so as to provide a substantially Y-shaped structure the free ends of each of said bars being arcuated as indicated at 8 and shown to advantage in Fig. 1 in order to accommodate therebeneath a guide wheel 9, said guide wheel being rotatably mounted in a suitable frame 10 the latter having extending therefrom a squared shank 11 which engages through the free ends of the bar 7 and is resiliently engaged therewith by a coil spring 12, said squared shank 11 being in detachable engagement with an actuating lever 13 the latter having connected thereto an operating rod 14 by which movement is imparted to the wheel 9 in order to guide the wheel 9 during the traction of the cultivator. The frame 6 has transversely arranged therein approximately midway its ends a shaft 15 on which is revolubly mounted a pair of wheels 16 which are mounted within the frame in order to prevent the contacting of the same with vegetable growth should the cultivator be used for cultivating between rows while the bars 7 have the portions thereof adjacent their points of connection with the main frame arcuated in order to prevent the rupturing of the vegetable growth on the opposite sides of the frame should the latter contact therewith. The frame 6 is preferably made of metallic angle irons as shown to advantage in Fig. 4 in order to facilitate the attaching of guide members 17 to the forward and rear ends thereof the latter supporting the cultivator teeth beams which will be presently described.

A plurality of cultivator teeth supporting beams 18 are arranged longitudinally of the frame and have the rear ends thereof extended through the rear end of the frame 6, said beams being arranged in pairs so as to clamp the shanks 19 of the cultivator teeth 20 therebetween, each of said pair of beams being provided with a plurality of elongated alining slots 21 through which are engaged breakable pins 22 thereby preventing the incapacitating of the cultivator teeth 20 should the latter contact with embedded rigid objects in the earth, allowing the pins 22 to be broken which may be readily replaced at a minimum price in view of their inexpensive nature, they being made of wood or any other suitable material. Each of the shanks 19 are provided with a plurality of apertures 23 therein so as to regulate the depth of pentration of the teeth 20 as desired, each having extending from one of the marginal edges thereof a semicircular finger 24 which engages between the beams 18 and are likewise secured thereto by the breakable pins 22, said finger having a plurality of apertures 25 formed therein so as to regulate the positioning of the teeth allowing the same to be inclined or positioned at right angles to the frame 6 in the manner shown in Fig. 1. The forward ends of the beams 18 extend through the guide members 17 and are detachably connected at a point approximately subjacent the forward end of the frame 6 with a transversely extending rod 26, said forward ends having laterally extending therefrom annular collars 27 by which they are detachably engaged to the rod 26 by set screws 28. The beams 18 are resiliently associated with the forward and rear ends of the frame 6 between the guide members 17 by suitable elastic elements 29 each of which comprises a coil spring one end of which is in engagement with the upper longitudinal edges of said beams in proximity to the forward terminals thereof while the opposite end of each is in engagement with the horizontal portion of the angle iron comprising the frame 6. Each pair of shafts 18 has mounted therebetween at the forward and rear end thereof rollers 30 which are rotatably mounted on the lower ends of supporting shanks 31 the latter being identical with the shanks 19 provided with apertures therein and having the perforated arcuate finger 24 extending therefrom, said shank and said finger being associated with the beams 18 in the same manner as the shanks 19 of the cultivator teeth 20, said rollers or wheels 30 extending laterally from the supporting shanks 31 and regulating the depth of penetration of the teeth 20 as well as facilitating the traction of the cultivator.

A seat 32 is mounted on transverse supporting beams 33 to the rear of the axle 15 within reaching distance of a lever 34 the latter adapted for engagement with a segmental brake plate 35, said lever being in engagement with the operating rod 14 so as to manipulate the guiding wheel 9 by the operation thereof and locking the guide wheel in a predetermined position in view of the brake plate 35.

In order to simultaneously actuate the teeth supporting beams 18 a suitable elevating mechanism generally designated 36 is provided which comprises an auxiliary shaft 37 which is rotatably mounted on the forward end of the frame 6 and has fixedly secured thereto a sprocket wheel 38 over which is trained a sprocket chain 39, said chain being likewise trained over a sprocket wheel which is arranged on the outer terminal of a subshaft 40, the inner terminal of said subshaft being in engagement with an actuating wheel 41 which has connected thereto a grooved roller 42, said subshaft 40 being supported by a beam 43 and having interposed between the sprocket wheel on the outer terminal thereof and the operating wheel 41 a ratchet 43 and another sprocket wheel over which is trained a sprocket chain 44 the latter being trained over a sprocket wheel 45 which is carried by a revoluble shaft 46 mounted on the rear of the frame 6. The ratchet 43 is engaged with a pawl 47 so as to retain the shaft 40 in a fixed position at times after the latter has been actuated by the wheel 41. The shaft 37 is in connection, through the medium of a chain 48 with the rod 26 so as to cause the vertical movement of the rod 26 for elevating the forward end of the beams 18 when the actuating wheel 41 is operated in view of the fact that the chain 48 has one end thereof fixedly engaged with the shaft 37 so as to be rotated thereby, said shaft 46 being in connection with the rear ends of the beams 18 by chains 49 thereby causing the simultaneous actuation of the beams 18 when pressure is exerted on the wheel 41, the cultivator teeth being held out of engagement with the earth if so desired by the pawl and ratchet mechanism 43 and 47.

Motion is imparted to the wheels 16 by a power element 50 which is shown to be a gasolene engine although it is understood that any source of motive power may be used without departing from the spirit of the invention, said power element 50 being in connection with the axle 15 by a sprocket chain 51 thereby causing the rotation of the axle for revolving the wheel 16.

It may be sometimes desired to guide the cultivator from the rear of the frame 6 instead of by the lever 34 in which instance the same may be done by guide handles 52 which are secured to the transverse supporting beams 33 and extend rearwardly therefrom. It may be also desired at times to elevate the teeth 20 from engagement with the earth which is also provided for by the provision of the grooved roller 42 around which is trained a cable 52' an intermediate portion of which is fixedly engaged with said roller while the ends extends beyond the rear of the frame so as to be actuated by a person walking behind the frame. In disengaging the teeth from the earth, pressure is exerted on one end of the cable so as to impart motion to the wheel 42, which in turn intercommunicates motion to the shafts 37 and 46, causing the chains 48 and 49 to be respectively wound on the shafts 37 and 46, and being posititvely held out of engagement with the earth in view of the pawl and ratchet mechanism 43 and 47. When it is desired to reëngage the teeth with the earth, pressure is exerted on the opposite end of the cable, assuming that the pawl 47 has been disengaged from the ratchet 43, thereby causing the chains 48 and 49 to be unwound from their respective shafts. It is therefore seen that the teeth 20 may be set at any desired incline on the supporting beams 18 and at the same time may very lightly penetrate the surface of the soil or may be deeply embedded therein if so desired, a uniformity of penetration being had at all times if so desired by the provision of the rollers or wheels 30 as is obvious. Assuming that the operator is seated on the frame and is desirous of manipulating the wheel 9 pressure is exerted on the lever 34 so as to transmit motion to said guide wheel through the rod 14. If it be desired to elevate the teeth 20 the same may be done while the operator is seated on the frame by rotating the wheel 41 causing the sprocket chains 39 and 44 to be operated and subsequently the beams 18 through the mechanism heretofore described.

It will be understood that the above description and accompanying drawings comprehend only the general and preferred embodiment of my invention and that various minor changes in details of construction, proportion and arrangement of the parts may be made within the scope of the appended claims and without sacrificing any of the advantages of my invention.

Having thus fully described my invention what I claim as new and desire to secure by Letters Patent is:—

1. A cultivator including a frame, beams arranged longitudinally in pairs in said frame, teeth mounted on each pair of said beams for engagement with the earth, and means for simultaneously disengaging said teeth from the earth, said means being actuatable from either the top or rear of the frame at the option of the operator.

2. A cultivator including a frame having a plurality of beams associated therewith, teeth adjustably mounted on said beams, means for detachably engaging the teeth on the beam and permitting said teeth to be automatically disengaged from said beams when contacting with rigid objects in the earth to preserve the teeth from incapacitation.

In testimony whereof I affix my signature in presence of two witnesses.

ALBERTIS BOWDISH.

Witnesses:
M. E. JONES, Jr.,
EVERETT LANCASTER.

Copies of this patent may be obtained for five cents each, by addressing the "Commissioner of Patents, Washington, D. C."